US008185747B2

(12) United States Patent
Wood et al.

(10) Patent No.: US 8,185,747 B2
(45) Date of Patent: *May 22, 2012

(54) METHODS OF REGISTRATION FOR PROGRAMS USING VERIFICATION PROCESSES WITH BIOMETRICS FOR FRAUD MANAGEMENT AND ENHANCED SECURITY PROTECTION

(75) Inventors: Richard Glee Wood, Houston, TX (US); Christine Taunya Wood, Houston, TX (US)

(73) Assignee: Access Security Protection, LLC, Houston, TX (US)

( * ) Notice: Subject to any disclaimer, the term of this patent is extended or adjusted under 35 U.S.C. 154(b) by 608 days.

This patent is subject to a terminal disclaimer.

(21) Appl. No.: 11/893,583

(22) Filed: Aug. 16, 2007

(65) Prior Publication Data
US 2007/0288759 A1    Dec. 13, 2007

Related U.S. Application Data

(63) Continuation-in-part of application No. 11/054,153, filed on Feb. 9, 2005, now abandoned, which is a continuation-in-part of application No. 10/697,636, filed on Oct. 30, 2003, now abandoned, and a continuation-in-part of application No. 10/443,382, filed on May 22, 2003, now Pat. No. 7,047,204.

(51) Int. Cl.
*H04L 29/06* (2006.01)
(52) U.S. Cl. ................. 713/186; 726/9; 726/20
(58) Field of Classification Search .......... 713/186; 726/9, 20
See application file for complete search history.

(56) References Cited

U.S. PATENT DOCUMENTS

| 4,783,823 | A | * | 11/1988 | Tasaki et al. ................ 382/116 |
| 5,761,309 | A | * | 6/1998 | Ohashi et al. ............... 713/156 |
| 5,884,271 | A | | 3/1999 | Pitroda |
| 6,011,858 | A | | 1/2000 | Stock |
| 6,012,035 | A | | 1/2000 | Freeman |
| 6,035,406 | A | * | 3/2000 | Moussa et al. ............... 726/18 |
| 6,163,770 | A | | 12/2000 | Gamble |
| 6,208,973 | B1 | | 3/2001 | Boyer |
| 6,219,805 | B1 | * | 4/2001 | Jones et al. ................ 714/38.1 |
| 6,655,585 | B2 | * | 12/2003 | Shinn ......................... 235/382 |

(Continued)

OTHER PUBLICATIONS

Eiland, "A Bill to be Entitled an Act." Acts of the 75th Legislature, Regular Session, 1997.

(Continued)

*Primary Examiner* — David García Cervetti
(74) *Attorney, Agent, or Firm* — The Matthews Firm

(57) ABSTRACT

Methods for pre-registering a participant in a program database using a participant smart card and biometric data in a verification process to manage fraud and enhance security and privacy protection are disclosed. The methods include pre-registering, or alternatively registering, individual information including biometric data in the program database, forming a secured registered account for the participant, and assigning the participant smart card to the participant with the secured registered account. The methods continue by determining risk factors for the participant, assigning at least one program with program risk factors to the participant, authenticating identity of the participant at a program access point, receiving eligibility verification or denial of the participant to access and use assigned programs, and updating the database data for exit verification. Cardless and contactless methods for identity authentication, eligibility verification, and exit verification include using biometric data or biometric data and assigned risk factors for accessing programs.

27 Claims, 3 Drawing Sheets

U.S. PATENT DOCUMENTS

| | | | |
|---|---|---|---|
| 6,747,564 B1 * | 6/2004 | Mimura et al. | 340/5.52 |
| 6,765,470 B2 * | 7/2004 | Shinzaki | 340/5.52 |
| 6,766,041 B2 | 7/2004 | Golden | |
| 6,826,537 B1 | 11/2004 | Wood | |
| 6,895,383 B2 * | 5/2005 | Heinrich | 705/7.28 |
| 6,895,577 B1 * | 5/2005 | Noble et al. | 717/126 |
| 6,957,339 B2 * | 10/2005 | Shinzaki | 713/186 |
| 6,987,870 B2 * | 1/2006 | Harney et al. | 382/115 |
| 7,039,812 B2 * | 5/2006 | Kawan et al. | 713/186 |
| 7,069,444 B2 * | 6/2006 | Lowensohn et al. | 713/185 |
| 7,110,580 B2 | 9/2006 | Bostrom | |
| 7,137,553 B2 | 11/2006 | Register | |
| 7,161,465 B2 | 1/2007 | Wood | |
| 7,165,718 B2 * | 1/2007 | Blancas et al. | 235/380 |
| 7,274,807 B2 * | 9/2007 | Hillhouse et al. | 382/124 |
| 7,359,865 B1 * | 4/2008 | Connor et al. | 705/7.28 |
| 7,549,162 B2 * | 6/2009 | Aaron | 726/12 |
| 7,587,756 B2 * | 9/2009 | Peart et al. | 726/9 |
| 7,613,625 B2 * | 11/2009 | Heinrich | 705/7.28 |
| 2001/0048025 A1 * | 12/2001 | Shinn | 235/382 |
| 2002/0186838 A1 * | 12/2002 | Brandys | 380/30 |
| 2003/0005310 A1 * | 1/2003 | Shinzaki | 713/186 |
| 2003/0046128 A1 * | 3/2003 | Heinrich | 705/7 |
| 2003/0101348 A1 * | 5/2003 | Russo et al. | 713/185 |
| 2003/0128099 A1 | 7/2003 | Cockerham | |
| 2003/0163739 A1 * | 8/2003 | Armington et al. | 713/202 |
| 2003/0174867 A1 * | 9/2003 | Harney et al. | 382/116 |
| 2003/0208697 A1 * | 11/2003 | Gardner | 713/202 |
| 2003/0223625 A1 * | 12/2003 | Hillhouse et al. | 382/125 |
| 2003/0229791 A1 * | 12/2003 | De Jong | 713/182 |
| 2004/0059923 A1 * | 3/2004 | ShamRao | 713/186 |
| 2004/0172541 A1 * | 9/2004 | Ando et al. | 713/176 |
| 2005/0033688 A1 * | 2/2005 | Peart et al. | 705/39 |
| 2005/0114186 A1 * | 5/2005 | Heinrich | 705/7 |
| 2005/0144484 A1 * | 6/2005 | Wakayama | 713/202 |
| 2005/0286745 A1 * | 12/2005 | Kamata et al. | 382/115 |
| 2006/0064574 A1 * | 3/2006 | Rolfs | 713/1 |
| 2006/0080548 A1 * | 4/2006 | Okamura et al. | 713/186 |
| 2006/0082437 A1 * | 4/2006 | Yuhara | 340/5.82 |
| 2006/0184801 A1 | 8/2006 | Wood | |
| 2008/0016339 A1 * | 1/2008 | Shukla | 713/164 |

OTHER PUBLICATIONS

Odgen, "A Bill to be Entitled an Act." Acts of the 78th Legislature, Regular Session, 2003.

"Texas Senate Special Committee on Prompt Payment of Health Care Providers." Interim Report to the 78th Legislature, Nov. 2002.

Rehnquist, Janet. "Improper Fiscal Year 2002 Medicare Fee-for-Service Payments," Jan. 8, 2003 (A17-02-02202).

* cited by examiner

METHODS OF REGISTRATION FOR PROGRAMS USING VERIFICATION PROCESSES WITH BIOMETRICS FOR FRAUD MANAGEMENT AND ENHANCED SECURITY PROTECTION

CROSS REFERENCE TO RELATED APPLICATIONS

This application is a continuation-in-part of U.S. patent application Ser. No. 11/054,153, entitled "Controlling Fraud And Managing Security Using Risk Factors," filed on Feb. 9, 2005, now abandoned which is a continuation-in-part of U.S. patent application Ser. No. 10/697,636, entitled "Process And Method Of Screening An Individual At A Point of Entry To A Secure Environment to Ascertain A Risk Factor" filed Oct. 30, 2003 and now abandoned, and a continuation-in-part of U.S. patent application Ser. No. 10/443,382, entitled "Methods For Reducing Fraud In Government Programs" filed May 22, 2003 now U.S. Pat. No. 7,047,204 and now issued, which are all incorporated herein by reference.

FIELD

The embodiments of the methods relate generally to pre-registering a participant in a program database using biometric data of the participant in a verification process to facilitate fraud management and to enhance security management and privacy protection.

BACKGROUND.

Fraud management, security management, and privacy protection are three of the greatest and most costly concerns for providers of programs, such as healthcare products and services, benefits services, controlled access to secured facilities and other controlled access programs. The concerns of these program providers include, but are not limited to, a breach of security, a theft of a participant's identity, an invasion of privacy, and a fraudulent program access or use. For example, security concerns exist in the areas of identifying individuals to properly receive medical care, pharmaceutical products, insurance benefits, and other goods or services as well as for properly identifying individuals to access secured facilities, controlled borders, and other secured programs. These concerns can arise when individuals, who should not have access to a particular program, obtain a wrongful access or use of the program and pilfer the products, benefits, and/or services of the program.

Some improvements to security management for accessing particular specified programs have been accomplished through the use of smart cards and other security cards. However, each year, program providers are still spending millions on correcting registrations of individuals for public and private programs as well as on addressing a magnitude of costs associated with correcting fraudulent use, privacy intrusions, and security violations.

A need exists for a method to pre-register a participant for accessing a particular program by using a participant smart card and a combination of biometric data and risk factors for identity authentication, eligibility verification, and exit verification and completion of the program, thereby preventing fraudulent access and use of the program.

A need exists for a method to pre-register, or alternatively register, a participant for use of a particular public or private program, which eliminates fraud and enhances security and privacy protection by using biometric data and risk factors, that are assigned to the participant and the program in a verification process for identity authentication, eligibility verification, and exit verification and program completion.

A need exists for methods to pre-register, or alternatively register, a participant for public and private programs, in which the methods enhance security and privacy protection and substantially reduce the magnitude of costs for corrections associated with the fraudulent access and/or use of the programs.

The embodiments meet these needs.

SUMMARY

The embodiments relate generally to methods for pre-registering a participant in a program database by using a participant smart card and biometric data or a cardless biometric data of the participant for identity authentication, eligibility verification, and exit verification and program completion. The verification processes facilitate fraud management and enhance security management and privacy protection for the participant accessing and using the programs.

The embodiments of the methods include pre-registering individual information including a first biometric data representing the participant in the program database as database data and forming a secured registered account for the participant. The methods continue by assigning a participant smart card to the participant with the registered account and assigning at least one program to the participant. The assigned programs are public and private programs, including government funded programs, that can be stored on the participant smart card and in the secured registered account in the program database for use by the participant with the registered account.

The steps of the methods include verifying that the participant, with the participant smart card at a program access point, is the correct smart card holder by an identity authentication process performed in real-time at the program access point using individual information and biometric data of the participant.

An embodiment of the methods includes determining risk factors for the participant and assigning the risk factors to the programs stored on the participant smart card for the participant. Next, the assigned risk factors stored on the participant smart card can be linked to a corresponding at least one program, which is assigned to the participant and stored in the program database. Then, risk factors can be determined and assigned to the corresponding at least one program and stored in the program database as program risk factors. Participant risk factors and assigned program risk factors can be used for determining and verifying eligibility of the participant for accessing and using the programs.

The steps of the methods continue by transmitting in a first transmission the smart card data from the program access point to the program database and requesting an eligibility verification of the participant to use the participant smart card for accessing at least one program. Next, the methods continue by receiving in a second transmission the eligibility verification or denial of the participant to use at least one program from the program database to the program access point.

In an embodiment of the methods, additional individual information and biometric data can be obtained on the participant for use in identity authentication and eligibility verification.

The embodiments of the methods include updating the database data by transmitting in a third transmission from a program exit point to the program database that the participant has engaged the program exit point, for updating the database data stored in the program database. The database data can be updated after use by the participant of the participant smart card and at least one assigned program for exit verification and program completion.

Alternatively, a participant, who is not pre-registered, can be registered at the program access point by obtaining individual information including biometric data of the participant for forming a secured account and assigning a temporary participant smart card to the participant for accessing at least one public or private program.

The embodiments include cardless methods using biometric data of the participant in a verification process for accessing and using public and private programs. The steps of the cardless methods include pre-registering individual information, including a first biometric data representing the participant, in the program database as database data and forming a secured registered account for the participant. The steps of the cardless methods continue by assigning at least one program to the participant with the secured registered account and storing each assigned program in the secured registered account of the program database for use by the participant.

The embodiments of the cardless methods include verifying that the participant at a program access point matches the database data, and the participant is eligible to access at least one assigned program.

In an embodiment, the cardless methods include verifying the participant's identity and eligibility by obtaining individual information including a second biometric data of the participant at the program access point and using a biometric device, in communication with the program access point and the program database, for transmitting the individual information including the second biometric data of the participant from the program access point to the program database. This first transmission can be used for requesting an identity authentication of the participant and an eligibility verification to access and use at least one assigned program. Alternatively, the first transmission can be transmitted to request and obtain identity authentication of the participant, only.

The embodiments of the cardless methods include comparing the transmitted individual information including the second biometric data of the participant to the database data. The comparison can verify that the transmitted individual information including the second biometric data of the participant is identical to the database data, for authenticating the identity of the participant. Alternatively, the comparison can deny identity authentication because the individual information including the second biometric data of the participant is not identical to the database data. In an embodiment of the cardless methods, additional individual information including additional biometric data can be obtained for verifying identity authentication of the participant.

The steps of the cardless method continue by transmitting, in a second transmission from the program database to the program access point, the eligibility verification or denial of the participant for accessing and using at least one assigned program, thereby preventing fraud and enhancing security management and privacy protection. In an embodiment of the cardless method, risk factors are determined, based on information obtained from the participant, and assigned to the programs stored in the program database for the participant. The program risk factors can be used in verifying the participant's eligibility to access and use the assigned programs.

The embodiments of the cardless methods can include updating the database data by transmitting in a third transmission from a program exit point to the program database that the participant has engaged the program exit point for updating the database data. The updating of the database data is performed after use by the participant of at least one assigned program and designates program completion and exit verification by the participant.

Alternatively, the embodiments include contactless methods using cardless biometric data or the participant smart card and biometric data of the participant in a verification process, including identity authentication, eligibility verification, and exit verification, for accessing and using public and private programs.

BRIEF DESCRIPTION OF THE DRAWINGS

In the detailed description of the embodiments presented below, reference is made to the accompanying drawings, in which.

Figure 1:
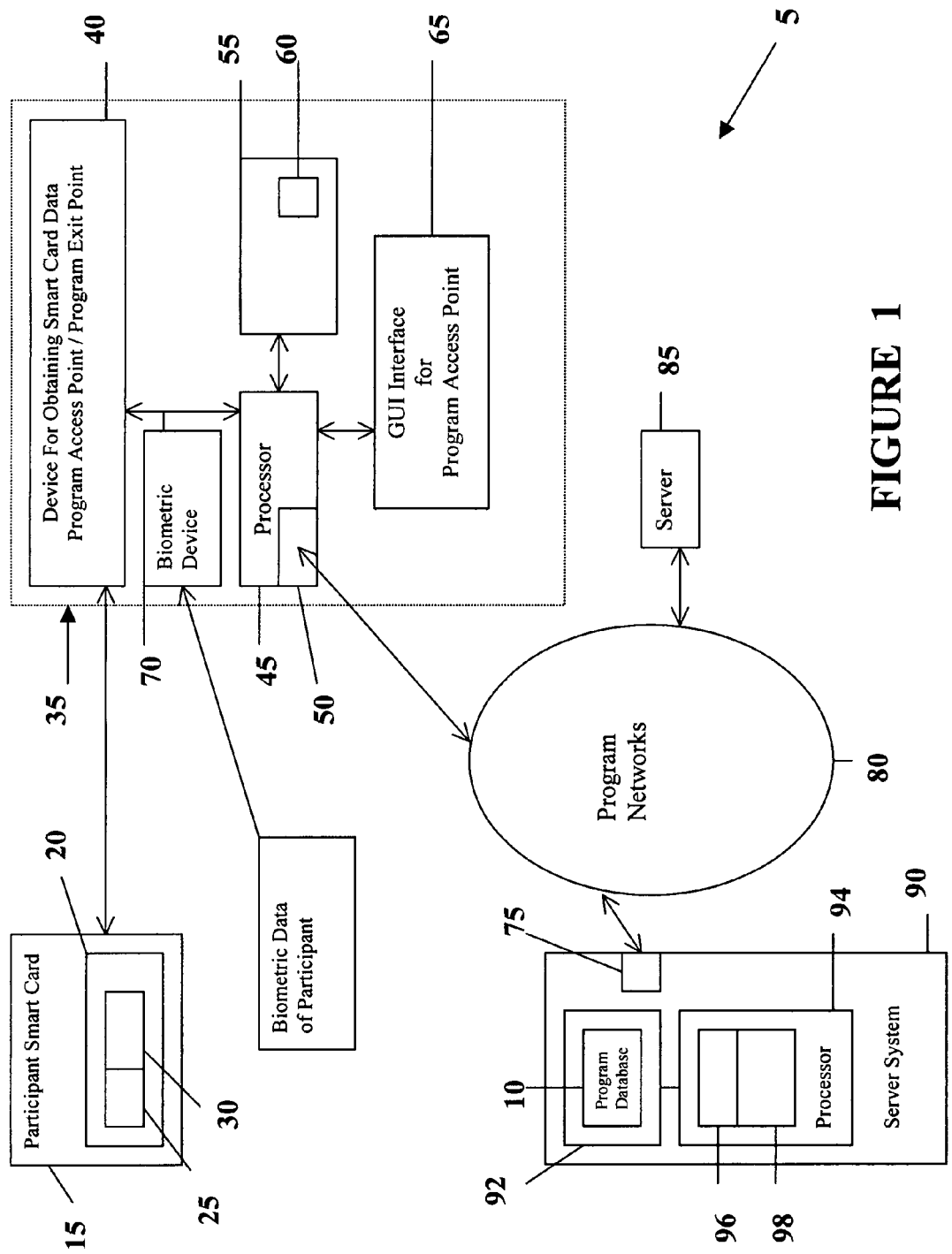
FIG. 1 depicts a diagram of an embodiment of a method for pre-registering a participant in a program database using a participant smart card, biometric data, and assigned risk factors in a verification process for accessing and using programs.

The present embodiments are detailed below with reference to the listed Figures.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

The embodiments relate generally to methods for pre-registering a participant in a program database by using a participant smart card and biometric data, or alternatively a cardless biometric data of the participant, in a verification process to enhance security and privacy protection for the participant. The verification process used in the methods can include the steps of identity authentication, eligibility verification, and exit verification and program completion for facilitating fraud management, security management, and privacy protection, when the pre-registered participant is accessing and using assigned programs.

Benefits of the methods include having a verification process that prevents the fraudulent use of programs assigned to a pre-registered or registered participant and allows program providers to authenticate and verify, with great accuracy, that the participant is the person that they claim to be for accessing a program and receiving the goods, benefits, and/or services of the program. The participant smart card and biometric data methods include the ability to easily store information, including pre-registration individual information and assigned program information, on a memory chip, microcontroller chip, barcode, or other computer storage within the participant smart cards as well as in the secured program databases. This allow the participant's identity and eligibility for accessing and using programs to be quickly and correctly verified, which enhances privacy protection in the program systems and significantly reduces the operating expense to the program providers for costly corrections associated with fraudulent use, security breaches, privacy intrusions, and identity theft.

Other benefits of the methods include having secured data storage on the participant smart card and in the secured program database for enabling real-time, secured information transmissions to protect the participant's privacy, and for providing easy and effective ways of performing information and biometric data matching functions and risk factor comparisons to increase security protection for the participant and the program providers. In addition, the verification steps of the methods prevent a participant from being harmed by receiving an unassigned product or service.

The embodiments of the methods for pre-registering a participant in a program database using a participant smart card for a verification process to facilitate fraud management, security management, and privacy protection include the steps of pre-registering individual information, including a first biometric data representing the participant, in the program database as database data and forming a secured registered account for the participant.

The participant can be a person, a family, a company of individuals, a group of individuals, a corporation of individuals, members of an institution, individuals of a business, individuals of an organization, members of an agency, members of an association, an animal, a group of animals, and combinations thereof. The pre-registration individual information can include: a first biometric data of the participant, a participant's personal identification number code, a participant's first electronic signature, a participant's first biometric signature, an participant's digital photograph, an participant's first biometric digital image, an participant's first electro-biometric signature, a first personal data of the individual, other individual information representing the participant, and combinations thereof.

The methods to pre-register a participant in a program database continue by assigning the participant smart card to the participant with the secured registered account. The secured registered account for the participant can include a record or a statement of entries for the participant that covers any transaction involving the use of the participant smart card, or at least one biometric data of the participant for accessing a program. The secured registered account can include transactions during a particular period of time for maintaining a secured record and protecting the participant's privacy.

The participant smart card is a device for storing individual information and biometric data of the participant, assigned risk factors, and assigned program information. The participant smart card can include an embedded integrated circuit chip, such as a memory chip, microcontroller chip, or other computer chip, for storing the information and data. The participant smart card can be portable and easy to carry and can be made of a plastic, a solid, a metal, or a laminate material.

Alternatively, the participant smart card can be the size of a computer chip, which can be placed in garments or accessories that are attachable to the participant, such as a belt or a collar for a registered dog, a registered cat, or a registered race horse. In an embodiment, the participant smart card can be injectable. For example, a race horse can be pre-registered in a program database, using individual information and biometric data, such as the race horse's Deoxyribonucleic Acid (DNA) or the race horse's retina or iris, and issued a participant smart card that is injectable. The injectable participant smart card can be used for verifying identity authentication of the race horse and eligibility verification to access and use a secured area of the racetrack, prior to a race starting. In addition, the injectable participant smart card can be used for accessing and using veterinarian services, or other goods and services that are animal related.

The participant smart card activates upon contact with a reader, a detector, a scanner, or combinations thereof. Alternatively, the participant smart card can be activated by a contactless communication, such as an electromagnetic reader. The reading, detecting, or scanning of the participant smart card can occur at a moment in time when the participant presents the participant smart card at a program access point for verifying and authenticating the identity of the participant. As an example, a contactless participant smart card can require only a close proximity to a reader, such as a radio-frequency reader, an electromagnetic reader, or a laser reader, for reading the participant's individual information and biometric data stored on the participant smart card to verify identity authentication.

The embodiments of the methods include storing a copy of the pre-registration individual information, including a first biometric data of the participant, in the data storage of the participant smart card, as smart card data. The data storage can be positioned on the participant smart card for storing individual information, biometric data, program information, and assigned risk factor information. The participant smart card can include a computer chip, a magnetic strip, a barcode, a two-dimensional storage, a three-dimensional storage, or combinations thereof, for storing information and data. For example, the participant smart card can include a computer chip with a processor that can be connected by an interface to a device for communicating individual information and biometric data of the participant to a program database network.

The device can be a laser reader or other participant smart card reader that via an interface, such as a graphical user interface (GUI), reads the participant's individual information and biometric data for verifying identity and eligibility of the participant to use an assigned program. The capability of storing combinations of large amounts of individual information, biometric data, risk factors, and program information on a smart card personalized to the participant, enables the participant smart card to be used for a large range of single to multiple public and private programs. Further, the use of the participant smart card with biometrics and assigned risk factors for accessing and using the programs provides fraud management, security management, and privacy protection that has not heretofore been available for real-time and instantaneous use by a participant.

The embodiments of the methods to pre-register a participant for programs permit the storing of the participant's individual information, which can include: a participant's name, a participant's address, a participant's phone number, a participant's pin number, a government issued number, a government security clearance code, a government issued status, a military status, a citizenship information, a passport number, a racial background, a country of origin, a voluntary emergency contact person's name, voluntary health information, a participant's health insurance information, a participant's social security number, an emergency contact medical physician, a primary medical provider name, a participant's date of birth, a participant's place of birth, a participant's weight, a participant's height, a participant's hair color, a participant's occupation, a participant's account information, a participant's medical information, a participant's assigned identification number, and combinations thereof.

The embodiments of the method include copying the pre-registration individual information including the first biometric data of the participant from the program database and storing as smart card data on the participant smart card. The copy of the pre-registration individual information, including the first biometric data representing the participant, can be a portion of the pre-registration individual information or an entirety.

The steps of the method continue by assigning at least one program to the participant with the secured registered account. Each assigned program can be stored on the participant smart card and in the secured registered account of the program database. The assigned programs can be private programs, public programs, or government programs for providing access to goods or products, benefits, services, or controlled or secured entities. A controlled or secured entity can include a secured area, a secured area within a secured facility, a secured facility, a secured track, a secured border, a secured institution, a secured organization, a secured entry for a program assigned to the participant, and other controlled or secured entities.

The next steps of the method for pre-registering a participant in a program database include obtaining individual information for determining a risk factor for the participant. In an embodiment of the methods, the risk factor for the participant can be determined by assigning each determined risk factor for the participant to at least one program assigned to the participant and stored on the participant smart card, storing each assigned risk factor for the participant on the participant smart card, and linking each assigned risk factor stored on the participant smart card to a corresponding at least one program, which is assigned to the participant and stored in the program database. The embodiments of the methods include assigning at least one program risk factor to each corresponding program assigned to the participant and stored in the program database, for use in eligibility verification.

The embodiments of the methods include steps for determining the risk factors for the participant by verifying personal data obtained on the participant, verifying biometric data obtained on the participant, verifying documentation requested on the participant, obtaining answers to a plurality of questions from the participant, verifying other requested individual information representing the participant, and combinations thereof.

The participant risk factors can be based on a determined designation, that is associated with the participant as a result of the participant's answers to a plurality of questions or answers that are provided on behalf of the participant. The plurality of questions for determining participant risk factors can regard: a participant's name, a participant's address, a participant's nationality, a participant's immigration, a participant's social security number, a participant's weight, a participant's height, a participant's passport number, a participant's government identification number, a participant's drivers license number, a participant's credit card number, a participant's fingerprint, a participant's medical history, a participant's age, a participant's occupation, a participant's police or arrest record, a participant's date(s) of access to a program, a participant's date(s) of completion of a program, a participant's range of dates for use of a program, a participant's percentage or frequency of use of a program, a participant's length of time for use of a program, and combinations thereof.

The participant risk factors can be letters, numerals, or other designations. For example, the participant risk factors can be a letter ranging from "A" to "G," which can be determined during pre-registration, or alternatively during registration, of the participant.

As an example, the participant can be assigned a zero risk designation, when initially pre-registered. The zero risk designation can be stored on the participant smart card and in the program database for the participant as a participant risk factor "G." Then, the determination of participant risk factors "A" to "F" can be derived from a percentage of verifications regarding the individual information and biometric data of the participant and a percentage of answers provided to a plurality of questions, for which the participant risk factor is assigned and stored as pre-registration individual information, or alternatively registration individual information.

As an example, if the participant's individual information and biometric data verifies 100% of the time that the participant is the participant that they claim to be and the participant answers "yes" 90%-100% of the time to a plurality of questions, then a participant risk factor of "A" is assigned to the participant and stored on the participant smart card for designating the participant as a "low risk" for accessing and using an assigned program. Alternatively, the embodiments of the methods allow a designated individual to provide answers for a participant or on a participant's behalf.

If the participant's individual information and biometric data are verified 90% of the time and the participant answers "yes" 80%-89% of the time to the plurality of questions, then a risk factor of "B" is assigned to the participant, as a "slightly higher risk." If the participant's individual information and biometric data are verified 80% of the time and the participant answers "yes" 70%-79% of the time to the plurality of questions, then a risk factor of "C" is assigned to the participant. If the participant's individual information and biometric data are verified 70% of the time and the participant answers "yes" 60%-69% of the time to the plurality of questions, then a risk factor of "D" is assigned to the participant. If the participant's individual information and biometric data are verified 60% of the time and the participant answers "yes" 50%-59% of the time to the plurality of questions, then a risk factor of "E" is assigned to the participant. If the participant's individual information and biometric data are verified less than 50% of the time and the participant answers "yes" less than 50% of the time to the plurality of questions, then a risk factor of "F" is assigned to the participant.

The next steps of the method include authenticating the identity of the participant by verifying at a program access point that the participant with the participant smart card matches the smart card data. In an embodiment of the method, the identity authentication of the participant can include the steps of reading the smart card data using a device, such as a laser reader, in communication with the program access point and the program database and obtaining individual information, including a second biometric data of the participant with the participant smart card, at the program access point. The individual information including a second biometric data can be obtained by using a biometric device, such as a laser biometric reader. The next steps of the identity authentication include comparing the smart card data to the participant's individual information, including the second biometric data of the participant, to verify that the smart card data is identical to the individual information including the second biometric data of the participant, for verifying identity authentication.

The embodiments of the methods further permit fraud management by scanning and transmitting a participant's biometric data stored on the participant smart card, scanning and transmitting a cardless biometric data of the participant, scanning and transmitting a cardless individual information of the participant, scanning and transmitting a contactless biometric data of the participant, scanning and transmitting a contactless individual information of the participant, photographing a cardless biometric data of the participant, scanning and transmitting a biometric data of the participant within a close proximity of the program access point, and combinations thereof, for comparison to the database data to verify identity authentication.

The embodiments of the methods include using a device for reading, scanning, or detecting the smart card data to verify identity authentication of the participant at the program access point. The device at the program access point for use with the smart card data can be: a fingerprint reader, a numerical code reader, a voice pattern recognition reader, a retinal scanner, an iris scanner, a telemetry card reader, a barcode reader, a Deoxyribonucleic Acid (DNA) reader, a palm reader, a facial recognition reader, a vein reader, a laser reader, a biometric reader, a radio-frequency reader, an electromagnetic reader, other contactless readers, a laser biometric scanner, other biometric scanners, a digital camera, a digital video camera, a laser detector, a wireless detector, other detectors, other readers, and combinations thereof.

The embodiments of the methods include using a biometric device, such as a laser biometric reader or other biometric device for obtaining the participant's individual information, including the second biometric data of the participant. Alternatively, the device at the program access point that is used for obtaining smart card data can be used for obtaining the individual information including the second biometric data of the participant.

The program access point provides access to public programs and private programs, which can include: a private healthcare program, a government healthcare program, a public healthcare prompt payment program, a private healthcare prompt payment program, a government healthcare prompt payment program, a healthcare products program, a medical services program, an insurance benefits program, a state human services program, a federal human services program, a city human service program, a county human services program, an authorized educational program, a controlled institutional program, an authorized funding provider program, a private membership program, a controlled membership program, a controlled border access program, a secured access services program, a secured access benefits programs, a secured access public program, a secured access private program, a secured access program for a controlled entity, a veterinarian services program, a controlled federal safety regulation services program, a controlled state safety regulation services program, and combinations thereof. These programs are examples of the types of programs readily accessible using this type of technology and can include the application of other programs as other programs become available.

The next steps of the methods include transmitting in a first transmission the smart card data from the program access point to the program database and requesting an eligibility verification of the participant to use the participant smart card for accessing at least one program. The steps of the methods continue by receiving in a second transmission the eligibility verification or a denial of the participant to use at least one program from the program database to the program access point, thereby preventing fraud and enhancing security management and privacy protection.

In an embodiment of the methods, the eligibility verification of the participant to use at least one program can include the steps of granting access to the participant to use at least one program based on a determination that the smart card data is identical to the database data for the participant, and the assigned risk factor stored on the participant smart card is within an available scope of at least one program risk factor for the corresponding at least one program stored in the program database.

The program risk factors provide an available scope for determining and verifying the participant's eligibility to access and use the corresponding at least one program, that can be assigned to the pre-registered, or registered, participant. For example, a secured and controlled access program, such as a border control program for a country, can assign a program risk factor based on a level of safety-risk associated with the country. Determinations of the safety-risk associated with the country, can be based on answers to a defined set or plurality of questions regarding information about the country, such as: geographical location, residential housing, business activities and opportunities, employment rate, tourism, crime rate, police activities; percentage of natural disasters, such as earthquakes, hurricanes, typhoons, tornadoes, and other natural disasters; medical institutions, hospitals, educational institutions, higher learning institutions, annual rate of transportation accidents, percentage of drivers, percentage of voters, and other statistical information regarding safety-risk associated with the country for determining and assigning the border control program risk factors. Accordingly, the information for a "low-safety risk country" can include low percentages for crime rate, transportation-related accidents, police or military activities, and natural disasters or, alternatively, a high percentage for safe geographical location.

As an example, a program risk factor of "I" can be assigned to a border control program to designate a "low safety-risk country." Accordingly, participants with participant risk factors of "A," "B," "C," "D," "E," "F," and "G" can be within the available scope of the program risk factor "I" and can enter and exit the country through the border control program. A "slightly higher safety-risk country" can have a program risk factor of "II" assigned to its border control program, and participants with participant risk factors of "A," "B," "C," "D," "E," and "G" can be within the available scope for entering and exiting the borders of the country. A program risk factor of "III," assigned to a border control program for a country, can allow participants with participant risk factors of "A," "B," "C," "D," and "G" to enter and exit the borders of the country. A program risk factor of "IV," assigned to a border control program for a country, can allow participants with participant risk factors of "A," "B," "C," and "G" to enter and exit the borders of the country. A program risk factor of "V," assigned to a border control program for a country, can allow participants with participant risk factors of "A," "B," and "G" to enter and exit the borders of the country.

A program risk factor of "VI," can be assigned to a border control program for designating a "highest safety-risk country." When a participant at a border control program access point requests an eligibility verification for accessing the border and entering the country, the border control program risk factor of "VI" can be linked to the participant risk factor stored on the participant smart card for determining and verifying the participant's eligibility. Accordingly, only participants with participant risk factors of "A," the lowest risk for a participant, and "G," a zero level of risk, are within the available scope for entering and exiting the borders of the "highest safety-risk country." The participant risk factors and the assigned program risk factors are suggested by the definitions incorporated herein. Additional criteria or elements that are common to other programs, as defined in this application, can be inserted or substituted for the items described and set forth herein.

Alternative embodiments of the methods can include denying eligibility verification of the participant to access and use at least one program based on determinations that the smart card data is not identical to the database data for the participant, the requested eligibility verification is for at least one program that is not assigned to the participant, the assigned risk factor stored on the participant smart card is not within the available scope of at least one program risk factor for the corresponding at least one program stored in the program database, and combinations thereof.

The embodiments of the methods include facilitating the transfer of information on-line and in real-time between the program database and the participant with the participant smart card, at the program access point. The facilitation of the transfer of information between the program database and the program access point provides simultaneous and real-time matching of the smart card data with the database data. In an embodiment, additional individual information and biometric data on the participant can be obtained for verifying identity authentication and eligibility verification.

The program database can be a publicly-owned database, a government-owned database, a privately-owned database, or combinations thereof. The program database for pre-registering the participant with a secured registered account and for accessing eligibility verification to use the public and private programs can include: United States (U.S.) Central Intelligence Agency (CIA) database, a county agency database, a state agency database, a federal agency database, an Immigration and Naturalization database, a U.S. Border Patrol database, a U.S. police database, an Interpol database, a private business database, a state institution database, a state driver's license database, an Internal Revenue Service (IRS) database, an educational institution database, a voter's registration bureau database, a professional licensure database, a state human service agency database, a federal human service agency database, a city human service agency database, a county human service agency database, a drug enforcement agency database, a social security agency database, a healthcare provider database, a hospital database, a clinic database an insurance provider database, a service provider database, an employment agency database, an authorizing provider database, a banking database, and combinations thereof. The program databases are examples of the types of program databases readily accessible using this type of technology and can include the application of other program databases as other program databases become available.

The embodiments of the methods include updating the database data stored in the program database for the participant with the secured registered account by transmitting in a third transmission from a program exit point to the program database that the participant has engaged the program exit point for updating the database data stored on the program database, after use by the participant of the participant smart card for exit verification. The program exit point can be identical to the program access point. Alternatively, the program exit point can be different from the program access point for exiting and completing the program.

The database data stored on the program database for the participant with the secured registered account can include: a first biometric data of the participant, an participant's personal identification number code, an participant's electronic signature, an participant's biometric signature, an participant's digital photograph, an participant's biometric digital image, an participant's electro-biometric signature, a personal data of the participant, an assigned risk factor for the participant, public program information for the participant, private program information for the participant, a risk factor assigned to a public program for the participant, a risk factor assigned to a private program for the participant, a second biometric data of the participant, other individual information representing the participant, and combinations thereof.

In an alternative embodiment, the steps of the methods can include registering a participant at the program access point by obtaining registration individual information including a first biometric of the participant to form a secured registered account and assigning a temporary participant smart card to the participant for accessing at least one program, when the participant at the program access point is not pre-registered.

With reference to the figures, FIG. 1 depicts a diagram of an embodiment of a method for pre-registering a participant in a program database using a participant smart card and biometric data of the participant in a verification process and system for facilitating fraud management and enhancing security management and privacy protection (5). The verification system to pre-register the participant in a program database by using a participant smart card and biometric data of the participant includes: a participant smart card (15) assigned to the participant with the secured registered account, a program access point (35) for obtaining smart card data and individual information including biometric data, and a program database (10) in communication with the program access point (35). In an embodiment the program access point is identical to the program exit point. Alternatively, the verification system can include a program exit point that is not identical to the program access point.

The steps of the verification methods (5) include pre-registering individual information, including a first biometric data representing the participant, in the program database (10), such as a privately-owned database or government-owned database, and storing the individual information including the first biometric data in the program database (10) as database data, for forming a secured registered account for the participant.

The next steps of the methods for pre-registering a participant in a program database include assigning the participant smart card (15) to the participant with the secured registered account. The participant smart card (15) can be an electronically readable card that includes a processor (20) with a chip (25), such as a memory chip or other computer chip, and a data storage (30). The data storage (30) can be a single dimensional, a two-dimensional, a three-dimensional, or other multi-dimensional data storage for storing a copy of the pre-registration individual information, including the first biometric data of the participant, as smart card data. In an alternative embodiment, the participant smart card (15) can include a magnetic strip, a barcode, and combinations thereof, for storing a large amount of information on the participant smart card.

In an embodiment of the methods, the information stored on the participant smart card can be encrypted to protect the participant's security and privacy. In an embodiment, the participant smart card (15) is injectable for use with participants, such as animals or groups of animals.

The steps of the methods for pre-registering a participant in a program database include assigning at least one program to the participant with the secured registered account and storing each assigned program on the participant smart card (15) and in the program database (10). Each assigned program stored in the program database (10) can be assigned at least one program risk factor for use in determining and verifying the participant's eligibility to access and use each assigned program.

The steps of the methods continue by obtaining individual information on the participant for determining a risk factor, which can be assigned to at least one program for the participant and stored on the participant smart card (15) as assigned participant risk factors.

The steps of the methods for pre-registering a participant continue by verifying at a program access point (35) that the participant with the participant smart card (15) matches the smart card data for an identity authentication. The program access point (35) can include the use of a reading device (40), such as a reader, a processor, a server system, a scanner, a detector, a laser reader, a laser scanner, a program database, a wireless system, and combinations thereof, for obtaining the participant's pre-registration information stored on the participant smart card (15). The program access point (35) can include a processor (45) in communication with a memory (55) and a graphical user interface (65). The memory (55) can include computer instructions (60) to instruct the processor (45) to connect to a program network (80) via an I/O port (50). The program network (80) can connect to a program server system (90) via an I/O port (75) for communicating with the program database (10) to perform such functions as: an internet query, an e-mail query, a transmission of individual information representing the participant, a transmission of biometric data of the participant, a transmission of program information, a comparative information transfer, a transmission of personal data, other system query, and combinations thereof.

In an embodiment, the methods include verifying identity authentication of the participant at the program access point (35) by reading the smart card data using the reading device (40) in communication with the processor (45) at the program access point (35), and in communication with the program database (10). The next step in the identity authentication includes obtaining individual information, including a second biometric data from the participant at the program access point, by using a biometric device (70).

The biometric device (70) can be a fingerprint reader, a numerical code reader, a voice pattern recognition reader, a retinal scanner, an iris scanner, a telemetry card reader, a barcode reader, a Deoxyribonucleic Acid (DNA) reader, a palm reader, a facial recognition reader, a vein reader, a laser reader, other biometric reader, a radio-frequency reader, an electromagnetic reader, other contactless biometric reader, a laser biometric scanner, other biometric scanner system, a digital camera, a digital video camera, a laser biometric detector, a wireless detector, a processor, a server system, and combinations thereof.

The next steps of the method for identity authentication include comparing the smart card data to the individual information, including the second biometric data of the participant, to verify that the smart card data is identical to the second individual information, including the second biometric data of the participant, for the identity authentication.

In an embodiment of the method, the steps can include obtaining additional individual information on the participant at the program access point (35) for verifying the identity authentication by: requesting and obtaining additional biometric data of the participant by using the biometric device (70), requesting and obtaining additional individual information representing the participant by using the reading device (40) at the program access point, requesting and obtaining documentation on the participant by using the reading device (40) at the program access point, other request for individual information on the participant at the program access point (35), and combinations thereof.

Alternatively, the methods can include denying identity authentication of the participant at the program access point by determining that the smart card data, obtained using the reading device (40) at the program access point (35), is not identical to the individual information including the second biometric data of the participant, obtained by using the biometric device (70) at the program access point.

The embodiments of the methods permit the program access point (35) to provide scanning, detection, reading, comparative information transfers, comparative data analysis, and combinations thereof, at a moment in time when the participant presents the participant smart card (15) and individual information, including a second biometric data of the participant, for real-time matching of the smart card data to the individual information including the second biometric data to verify identity authentication of the participant.

The steps of the method for pre-registering the participant continue by transmitting in a first transmission the smart card data from the program access point (35) to the program database (10), via the program network (80), and requesting an eligibility verification of the participant to use the participant smart card (15) for accessing at least one program.

The method facilitates the transfer of information between the participant with the participant smart card (15) and the program database (10), on-line and in real-time, using the program network (80). The program network (80) can include: a cable network, a wired network, a wireless network, a fiber optic network, a satellite network, a cellular network, a radio-proximity network, a laser-operated network, and combinations thereof. The program network (80) can include an internet network, a wide area network (WAN), a local area network (LAN), an intranet, a private area network, and combinations thereof, for transmitting information, including pre-registration individual information and a first biometric data, individual information including a second biometric data, program information, risk factor information, personal data, other individual information, and combinations thereof.

The steps of the method for verifying eligibility continue by receiving, in a second transmission, the eligibility verification or a denial of the participant to use at least one program from the program database (10) to the program access point (35), via the program network (80). The program database (10) can be a privately-owned database, a publicly-owned database, or a government-owned database for storing: individual information and biometric data on the participant, information on programs assigned to the participant, program risk factor information, participant risk factor information, and other information used by the pre-registered, or registered, participant for accessing, using, and exiting the assigned programs. The program database (10) is housed in a program data storage (92) of a program server system (90) for communicating with a program processor (94). The program processor (94) can include a program memory (98) and program computer instructions (96) for transmitting and receiving information and data between the program server system (90) and the participant smart card, via a program access point (35).

In an embodiment, the steps of the method for verifying eligibility can include sending additional transmissions to and from at least one secondary server system (85) in communication with the program network (80) to receive additional individual information including additional biometric data on the participant for eligibility verification.

The steps of the method include updating the database data stored in the program database (10) for the participant with the secured registered account by transmitting in a third transmission from a program exit point to a program database (10) that the participant has engaged the program exit point for updating the database data. The program exit point can be identical to the program access point (35). In another embodiment, the program exit point can be an alternative point or not identical to the program access point (35). The updating of the database data stored in the program database (10) can be performed after use by the participant of the participant smart card (15) and at least one assigned program for an exit verification and program completion.

Figure 2:
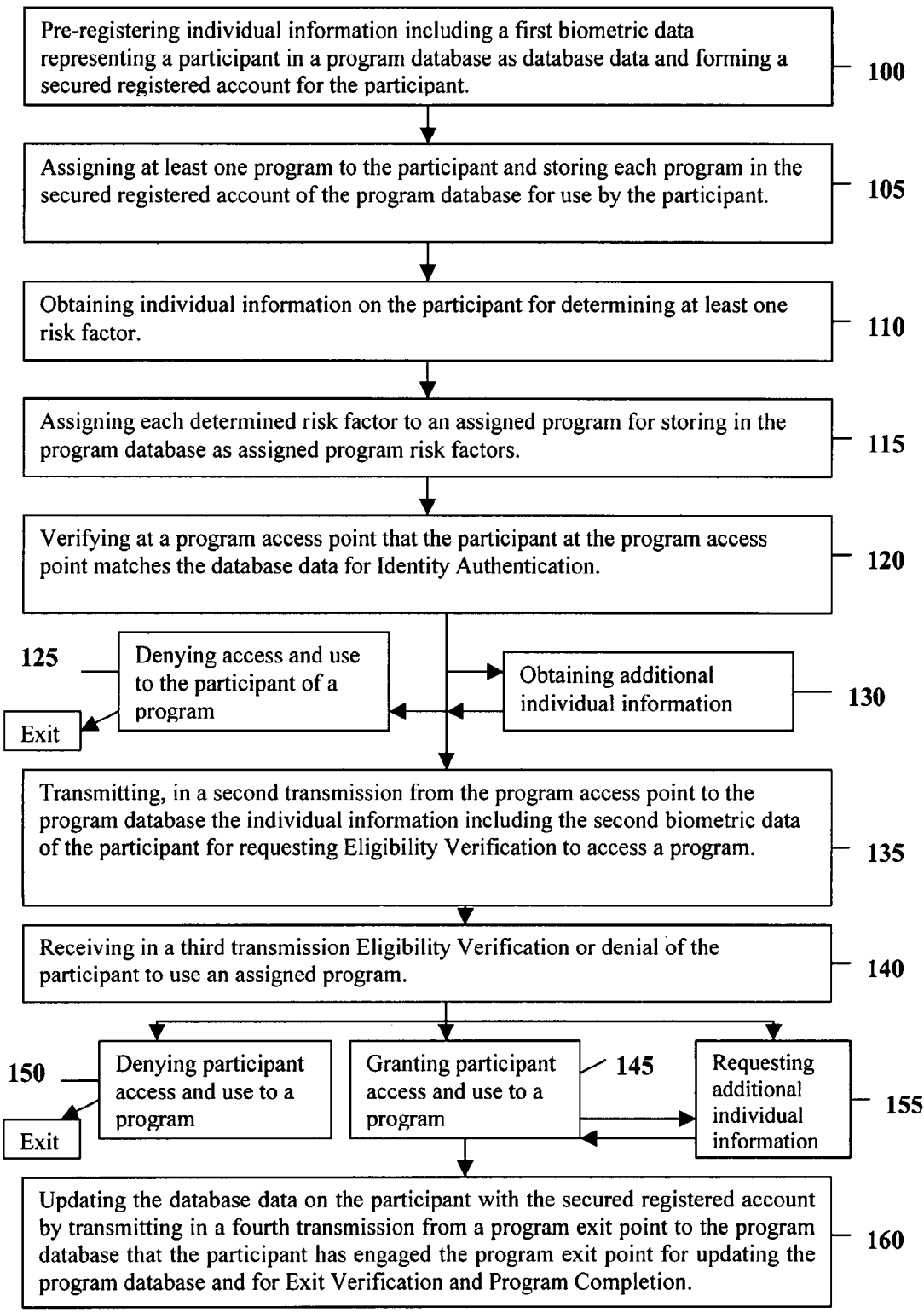
FIG. 2 depicts a flowchart of an embodiment of a cardless method for pre-registering a participant in a program database using biometric data of the participant and assigned risk factors in a verification process for accessing and using programs.

FIG. 2 depicts an embodiment of a cardless method for pre-registering a participant in a program database using biometric data of the participant and assigned risk factors for a verification process to facilitate fraud management, security management, and privacy protection.

The steps of the cardless method include pre-registering individual information including a first biometric data representing the participant in the program database as database data and forming a secured registered account for the participant (Step 100).

The next step of the cardless method includes assigning at least one program to the participant with the secured registered account (Step 105). Each assigned program can be stored in the secured registered account of the program database for use by the participant.

The steps of the cardless methods continues by obtaining individual information on the participant for determining at least one risk factor (Step 110), and assigning each determined risk factor to at least one assigned program for storing in the program database as an assigned program risk factor (Step 115).

The next step of the cardless methods for pre-registering a participant in a program database include verifying that the participant at a program access point matches the database data for identity authentication (Step 120). The steps of the identity authentication can include obtaining individual information including a second biometric data of the participant at the program access point using a biometric device in communication with a processor at the program access point and the program database, and transmitting in a first transmission the individual information including the second biometric data of the participant from the program access point to the program database. Then, the steps include comparing the transmitted individual information including the second biometric data of the participant to the database data to verify that the transmitted individual information including the second biometric data of the participant is identical to the database data, for verifying identity authentication of the participant.

Alternatively, the cardless methods can include the step of determining that the individual information including the second biometric data of the participant is not identical to the database data for denying the identity authentication of the participant and for exiting at the program access point (Step 125).

In an embodiment, the cardless method can include the step of obtaining additional individual information and biometric data on the participant at the program access point for verifying identity authentication by: requesting and obtaining additional biometric data of the participant, requesting and obtaining additional individual information on the participant, requesting and obtaining documentation on the participant, requesting other individual information on the participant, and combinations thereof (Step 130).

The cardless methods further include authenticating the identity of the participant by: scanning and transmitting a participant's biometric data, scanning and transmitting a cardless individual information of the participant, scanning and transmitting a contactless biometric data of the participant, scanning and transmitting a contactless individual information of the participant, photographing a cardless biometric data of the participant, scanning and transmitting a biometric data of the participant within a close proximity of the access point, and combinations thereof, to facilitate fraud management and to enhance security and privacy protection.

The next steps of the cardless methods can include transmitting, in a second transmission from the program access point to the program database, the individual information including the second biometric data of the participant for requesting access to at least one program stored in the program database (Step 135). Then, the steps of the cardless method include receiving eligibility verification or denial of the participant in a third transmission from the program database to the program access point for use of at least one assigned program (Step 140).

The steps of the cardless methods for eligibility verification include granting access to the participant to use at least one program assigned to the participant based on a determination that the individual information, including the second biometric data of the participant, is identical to the database data and the access by the participant to at least one assigned program is within an available scope of the assigned program risk factors for verifying eligibility (Step 145).

Alternatively, the cardless methods can include denying access to the participant to use at least one program based on a determination that the individual information including the second biometric data of the participant is not identical to the database data for the participant, the access requested by the participant comprises at least one program not assigned to the participant, the access requested by the participant comprises at least one program not within the available scope of the assigned program risk factors stored in the program database, and combinations thereof (Step 150). The participant exits the program access point when eligibility verification of the participant is denied (150).

In an embodiment, the cardless methods can include the step of obtaining additional individual information and biometric data on the participant at the program access point for verifying eligibility verification by: requesting and obtaining additional biometric data of the participant, requesting and obtaining additional individual information on the participant, requesting and obtaining documentation on the participant, requesting other individual information on the participant, and combinations thereof (Step 155).

The steps of the cardless methods include updating the database data stored in the program database for the participant with the secured registered account by transmitting in a fourth transmission from a program exit point to the program database that the participant has engaged the program exit point for updating the database data, after use by the participant of at least one assigned program for exit verification and program completion (Step 160). The program exit point can be identical to the program access point. Alternatively, the program exit point is not identical to the program access point.

For example, a pre-registered participant, with verified identity authentication, can request eligibility verification from a hospital program database for accessing and using assigned medical benefits, that are within the available scope of the program risk factors for the medical benefits program assigned to the participant. The participant can request the use of these assigned medical healthcare benefits on Aug. 10, 2008, at 9:00 a.m., while the participant is at a program access point in the doctor's clinic of Medical Center Hospital. Then, the participant can complete his access to these assigned medical healthcare benefits while the participant is in the physical therapy department of the Medical Center Hospital, by transmitting on Aug. 10, 2008, at 4:00 p.m., from the physical therapy department program exit point to the hospital program database that the participant has engaged the program exit point for updating the database data, after use by the participant of their assigned medical healthcare benefits program, including clinic benefits and physical therapy benefits, for exit verification and program completion.

The database data, which is stored in the program database and updated after use by the pre-registered, or registered, participant can include: individual information on the participant, a first biometric data of the participant, an participant identification number code, an electronic signature of the participant, a biometric signature of the participant, a participant's digital photograph, a participant's biometric digital image, a participant's electro-biometric signature, a personal data of the participant, risk factors for the participant, public program information for the participant, private program information for the participant, assigned risk factors for the public programs, assigned risk factors for the private programs, a second biometric data of the participant, additional biometric data of the participant, other individual information representing the individual, and combinations thereof.

Figure 3:
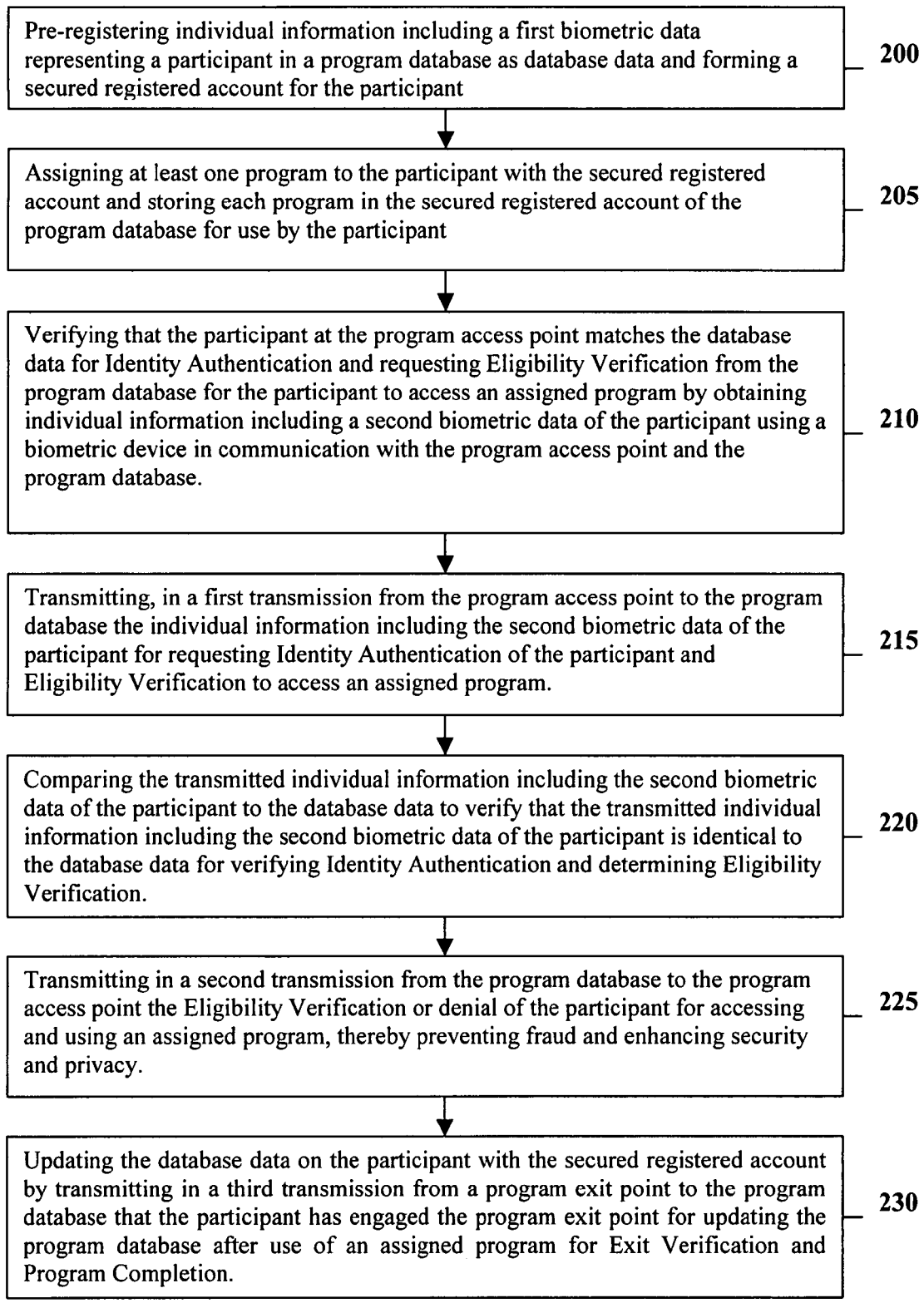
FIG. 3 depicts a flowchart of an embodiment of a cardless method for pre-registering a participant in a program database using biometric data of the participant in a verification process for accessing and using programs.

FIG. 3 depicts an embodiment of a contactless method for pre-registering a participant in a program database using biometric data of the participant for a verification process to facilitate fraud management, security management, and privacy protection. The steps of the contactless methods include pre-registering individual information, including a first biometric data representing the individual, in the program database as database data and forming a secured registered account for the participant (Step 200).

The next steps of the contactless methods include assigning at least one program to the participant with the secured registered account (Step 205). Each assigned program can be stored in the secured registered account of the program database for use by the participant.

The next steps of the contactless method include verifying that the participant at a program access point matches the database data, and the participant is eligible to access at least one assigned program by obtaining individual information including a second biometric data of the participant at the program access point using a biometric device in communication with a processor at the program access point and a program database (Step 210).

Next, the steps of the contactless methods include transmitting in a first transmission the individual information including the second biometric data of the participant from the program access point to the program database for requesting an identity authentication of the participant and an eligibility verification to access and use at least one assigned program (Step 215).

Then, the steps of the contactless methods include comparing the transmitted individual information including the second biometric data of the participant to the database data to verify that the transmitted individual information including the second biometric data of the participant is identical to the database data for verifying identity authentication of the participant and determining eligibility verification (Step 220).

The steps of the contactless methods continue by transmitting in a second transmission from the program database to the program access point the eligibility verification or denial of the participant for accessing and using at least one assigned program, thereby preventing fraud and enhancing security and privacy protection (Step 225).

Then, the steps of the contactless methods include updating the database data by transmitting in a third transmission from a program exit point to the program database that the participant has engaged the program exit point for updating the database data after use by the participant of at least one assigned program for exit verification and program completion (Step 230). Accordingly, the verification steps of the contactless methods for pre-registering a participant in a program database, including the steps of identity authentication, verification eligibility, and exit verification and program completion, prevent fraudulent use of the assigned programs and enhance security management and privacy protection for the participant.

Alternatively, the contactless methods can include the step of registering a participant at the program access point by obtaining registration individual information including a first biometric of the participant and assigning a secured registered account to the participant, which is stored in the program database for accessing at least one program when the participant at the program access point is not pre-registered.

An embodiment of the contactless methods includes assigning a contactless participant smart card to the participant with the secured registered account. The contactless participant smart card can be read, scanned, or detected at the program access point and the program exit point by using a biometric device, such as a radio-frequency operated biometric device, an electromagnetic biometric device, a laser biometric device, or other biometric device for use with the contactless participant smart card. The contactless participant smart card includes a data storage for storing smart card data, which can include a copy of the pre-registration individual information including the first biometric data, at least one program assigned to the participant, at least one risk factor assigned to the participant, and combinations thereof, for pre-registering the participant to access, use, and exit assigned programs stored in the program database.

While these embodiments have been described with emphasis on the embodiments, it should be understood that within the scope of the appended claims, the embodiments might be practiced other than as specifically described herein.

What is claimed is:

1. A method for pre-registering a participant in a program database using a participant smart card for a verification process to facilitate fraud management, security management, and privacy protection, wherein the steps of the method comprise:

a. pre-registering a first individual information comprising a first biometric data representing the participant in the program database as database data and forming a secured registered account for the participant;
  b. assigning the participant smart card to the participant with the secured registered account, wherein the participant smart card comprises a data storage for storing a copy of the pre-registration individual information comprising the first biometric data in the data storage as smart card data;
  c. assigning at least one program to the participant with the secured registered account, wherein each assigned program is stored on the participant smart card and in the program database, wherein each assigned program stored in the program database is assigned at least one program risk factor;
  d. obtaining a second individual information on the participant for determining a risk factor for the participant;
  e. authenticating the identity of the participant with the participant smart card by:
    i. reading the smart card data using a device in communication with a program access point;
    ii. obtaining a third individual information comprising a second biometric data of the participant with the participant smart card at the program access point;
    iii. comparing the smart card data to the third individual information of the participant to verify that the smart card data is identical to the third individual information of the participant for an identity authentication; and iv. if the smart card data and the third individual information are not identical, obtaining additional individual information, additional biometric data, or combinations thereof, of the participant at the program access point for authenticating identity of the participant with the participant smart card; and f. verifying the eligibility of the participant for at least one program by:

i. assigning a determined risk factor for the participant to at least one program stored on the participant smart card, wherein each assigned risk factor for the participant is stored on the participant smart card;

ii. linking each assigned risk factor stored on the participant smart card to a corresponding at least one program assigned to the participant and stored in the program database, wherein the corresponding at least one program is assigned to at least one program risk factor for verifying eligibility;

iii. transmitting in a first transmission the smart card data from the program access point to the program database and requesting an eligibility verification of the participant to use the participant smart card for accessing at least one program; and iv. receiving in a second transmission the eligibility verification or a denial of the participant to use at least one program from the program database to the program access point, wherein the eligibility verification of the participant provides the participant with access to at least one program based upon a determination that the smart card data is identical to the program database data for the participant and the assigned risk factor stored on the participant smart card is within an available scope of at least one program risk factor for the corresponding at least one program for verifying eligibility, thereby preventing fraud and enhancing security management and privacy protection; and h. updating the database data stored in the program database for the participant with the secured registered account by transmitting in a third transmission from a program exit point to the program database that the participant has engaged the program exit point for updating the database data after use by the participant of the participant smart card for an exit verification.

2. The method of claim 1, wherein the pre-registration first individual information comprises a member selected from the group consisting of: a first biometric data of the participant, a participant's personal identification number code, a participant's first electronic signature, a participant's first biometric signature, a participant's digital photograph, a participant's first biometric digital image, a participant's first electro-biometric signature, a first personal data of the participant, and combinations thereof.

3. The method of claim 1, wherein individual information representing the participant comprises a member selected from the group consisting of:

a. a participant's name;
b. a participant's address;
c. a participant's phone number;
d. a participant's pin number;
e. a government issued number;
f. a government security clearance code;
g. a government issued status;
h. a military status;
i. a citizenship information;
j. a passport number;
k. a racial background;
l. a country of origin;
m. a voluntary emergency contact person's name;
n. voluntary health information;
o. a participant's health insurance information;
p. a participant's social security number;
q. an emergency contact medical physician;
r. a medical provider name;
s. a participant's date of birth;
t. a participant's place of birth;
u. a participant's weight;
v. a participant's height;
w. a participant's hair color;
x. a participant's occupation;
y. a participant's account information; and
z. combinations thereof.

4. The method of claim 1, further comprising the step of determining the smart card data is not identical to the third individual information comprising the second biometric data of the participant for denying the identity authentication of the participant at the program access point.

5. The method of claim 1, wherein the database data comprises a member selected from the group consisting of: a first biometric data of the participant, a participant's personal identification number code, a participant's electronic signature, a participant's biometric signature, a participant's digital photograph, a participant's biometric digital image, a participant's electro-biometric signature, a personal data of the participant, an assigned risk factor for the participant, public program information for the participant, private program information for the participant, a risk factor assigned to a public program for the participant, a risk factor assigned to a private program for the participant, a second biometric data of the participant, additional biometric data of the participant, and combinations thereof.

6. The method of claim 1, further comprising the step of determining the risk factor for the participant by a member selected from the group consisting of: verifying personal data obtained on the participant, verifying biometric data obtained on the participant, verifying documentation requested on the participant, obtaining answers to a plurality of questions from the participant, verifying individual information representing the participant, and combinations thereof.

7. The method of claim 1, further comprising the step of sending additional transmissions to and from at least one secondary server system to receive additional individual information, additional biometric data, or combinations thereof, on the participant for the eligibility verification.

8. The method of claim 1, further comprising the step of storing individual information comprising biometric data on the participant smart card, wherein the participant smart card comprises a member selected from the group consisting of: a computer chip, a magnetic strip, a barcode, a two-dimensional data storage, a three-dimensional data storage, a data storage, and combinations thereof.

9. The method of claim 1, wherein the program access point provides scanning, detection, reading, or combinations thereof, at a moment in time when the participant smart card is presented for the identity authentication of the participant.

10. The method of claim 1, wherein the step of authenticating identity of the participant with the participant smart card comprises using a device selected from the group consisting of: a fingerprint reader, a numerical code reader, a voice pattern recognition reader, a retinal scanner, an iris scanner, a telemetry card reader, a barcode reader, a Deoxyribonucleic Acid (DNA) reader, a palm reader, a facial recognition reader, a vein reader, a laser reader, a biometric reader, a radio-frequency reader, an electromagnetic reader, a contactless readers, a laser biometric scanner, a biometric scanners, a digital camera, a digital video camera, a laser detector, a wireless detector, a detectors, a processor, a server system, and combinations thereof.

11. The method of claim 1, wherein the method for fraud management by authenticating identity of the participant further comprises a member selected from the group consisting of: scanning and transmitting a participant's biometric data stored on the participant smart card, scanning and transmitting a cardless biometric data of the participant, scanning and transmitting a cardless individual information of the participant, scanning and transmitting a contactless biometric data of the participant, scanning and transmitting a contactless individual information of the participant, photographing a cardless biometric data of the participant, scanning and transmitting a biometric data of the participant within a close proximity of the program access point, and combinations thereof.

12. The method of claim 1, wherein a processor at the program access point comprises the processor with a memory and a graphical user interface, wherein the memory comprises computer instructions to instruct the processor to connect to a program database network to form a member selected from the group consisting of: an internet query, an e-mail query, a transmission of individual information representing the participant, a transmission of biometric data of the participant, a transmission of program information, a comparative information transfer, a transmission of personal data, system queries, and combinations thereof.

13. The method of claim 1, wherein the method facilitates the transfer of information between the program database and the participant with the participant smart card on-line and in real-time using a network comprising a member selected from the group consisting of: a cable network, a wired network, a wireless network, a fiber optic network, a satellite network, a cellular network, a radio proximity network, a laser-operated network, and combinations thereof.

14. The method of claim 1, wherein the program access point provides access to programs comprising a member selected from the group consisting of: a private healthcare program, a government healthcare program, a public healthcare program, a public healthcare prompt payment program, a private healthcare prompt payment program, a government healthcare prompt payment program, a healthcare product program, a medical services program, an insurance benefits program, a state human services program, a federal human services program, a city human services program, a county human services program, an authorized educational program, a controlled institutional services program, an authorized funding provider program, a private membership program, a controlled membership program, a controlled border access program, a secured access benefits programs, a secured access services program, a secured access public program, a secured access private program, a secured access program for a controlled entity, a veterinarian services program, a controlled federal safety regulation services program, a controlled state safety regulation services program, and combinations thereof.

15. The method of claim 1, wherein the program database comprises a member selected from the group consisting of: a United States (U.S.) Central Intelligence Agency (CIA) database, a county agency database, a state agency database, a federal agency database, an Immigration and Naturalization database, a U.S. Border Patrol database, a U.S. police database, an Interpol database, a private business database, a state institution database, a state driver's license database, an Internal Revenue Service (IRS) database, an educational institution database, a voter's registration bureau database, a professional licensure database, a state human service agency database, a federal human service agency database, a city human service agency database, a county human service agency database, a drug enforcement agency database, a social security agency database, a healthcare provider database, a hospital database, a clinic database, an insurance provider database, a service provider database, an employment agency database, an authorizing provider database, a banking database, a membership database, a publicly-owned database, a government-owned database, a privately-owned database, and combinations thereof.

16. The method of claim 1, wherein the participant comprises a member selected from the group consisting of: a person, a family, a company of individuals, a group of individuals, a corporation of individuals, members of an institution, individuals of a business, individuals of an organization, members of an agency, members of an association, an animal, a group of animals, and combinations thereof.

17. The method of claim 1, further comprising the step of registering a participant at the program access point by obtaining registration individual information including a first biometric of the participant to form a secured registered account and assigning a temporary participant smart card to the participant for accessing at least one program when the participant at the program access point is not pre-registered.

18. The method of claim 1, further comprising the step of denying eligibility of the participant to use at least one program by:
   i. determining the smart card data is not identical to the database data for the participant;
   ii. determining the requested eligibility verification is for at least one program not assigned to the participant;
   iii. determining the assigned risk factor stored on the participant smart card is not within the available scope of at least one program risk factor for the corresponding at least one program stored in the program database; and
   iv. combinations thereof.

19. A cardless method for pre-registering a participant in a program database using biometric data of the participant for a verification process to facilitate fraud management, security management, and privacy protection, wherein the steps of the cardless method comprise:
   a. pre-registering a first individual information comprising a first biometric data representing the participant in the program database as database data and forming a secured registered account for the participant;
   b. assigning at least one program to the participant with the secured registered account, wherein each assigned program is stored in the secured registered account of the program database for use by the participant;
   c. obtaining a second individual information on the participant for determining at least one risk factor;
   d. assigning each determined risk factor to at least one assigned program for storing in the program database as an assigned program risk factor;
   e. verifying that the participant at a program access point matches the database data, wherein the steps for verifying comprise:
      i. obtaining a third individual information including a second biometric data of the participant at the program access point using a biometric device;
      ii. transmitting in a first transmission the third individual information of the participant from the program access point to the program database; and iii. comparing the transmitted third individual information of the participant to the database data to verify that the transmitted third individual information of the participant is identical to the database data for the identity authentication of the participant; and
f. verifying the eligibility of the participant for at least one program by:
i. transmitting in a second transmission from the program access point to the program database the third individual information of the participant for requesting access to at least one program stored in the program database;
ii. receiving eligibility verification or denial of the participant in a third transmission from the program database to the program access point for use of at least one assigned program, wherein eligibility verification of the participant to use at least one program provides the participant with access to use at least one program assigned to the participant based on a determination that the third individual information of the participant is identical to the database data and the access by the participant to at least one assigned program is within an available scope of the assigned program risk factors for verifying eligibility, thereby preventing fraud and enhancing security management and privacy protection; and
h. updating the database data stored in the program database for the participant with the secured registered account by transmitting in a fourth transmission from a program exit point to the program database that the participant has engaged the program exit point for updating the database data after use by the participant of at least one assigned program for exit verification and program completion.

20. The cardless method of claim 19, wherein the cardless method for fraud management by authenticating identity of the participant further comprises a member selected from the group consisting of: scanning and transmitting a participant's biometric data, scanning and transmitting a cardless individual information of the participant, scanning and transmitting a contactless biometric data of the participant, scanning and transmitting a contactless individual information of the participant, photographing a cardless biometric data of the participant, scanning and transmitting a biometric data of the participant within a close proximity of the access point, and combinations thereof.

21. The cardless method of claim 19, wherein the database data comprises a member selected from the group consisting of: pre-registration individual information on the participant, a first biometric data of the participant, a participant identification number code, an electronic signature of the participant, a biometric signature of the participant, a participant's digital photograph, a participant's biometric digital image, a participant's electro-biometric signature, a personal data of the participant, risk factors for the participant, public program information for the participant, private program information for the participant, assigned risk factors for the public programs, assigned risk factors for the private programs, a second biometric data of the participant, individual information representing the participant, and combinations thereof.

22. The cardless method of claim 19, further comprising the step of determining the third individual information comprising the second biometric data of the participant is not identical to the database data for denying the identity authentication of the participant at the program access point.

23. The cardless method of claim 19, further comprising the step of obtaining additional individual information on the participant at the program access point for verifying eligibility by requesting additional biometric data of the participant, additional individual information on the participant, or combinations thereof.

24. The cardless method of claim 19, wherein the biometric device at the program access point or program exit point comprises a member selected from the group consisting of: a fingerprint reader, a numerical code reader, a voice pattern recognition reader, a retinal scanner, an iris scanner, a telemetry card reader, a barcode reader, a Deoxyribonucleic Acid (DNA) reader, a palm reader, a facial recognition reader, a vein reader, a laser reader, a biometric reader, a radio-frequency reader, an electromagnetic reader, a contactless biometric reader, a laser biometric scanner, a biometric scanner, a digital camera, a digital video camera, a laser biometric detector, a wireless detector, a processor, a server system, and combinations thereof.

25. The cardless method of claim 19, further comprising the step of denying eligibility of the participant to use at least one program by:
i. determining the third individual information comprising the second biometric data of the participant is not identical to the database data for the participant;
ii. determining the access requested by the participant comprises at least one program not assigned to the participant;
iii. determining the access requested by the participant comprises at least one program not within the available scope of the assigned program risk factors stored in the program database; and
iv. combinations thereof.

26. A contactless method for pre-registering a participant in a program database using biometric data of the participant for a verification process to facilitate fraud management, security management, and privacy protection, wherein the steps of the contactless method comprise:
a. pre-registering first individual information comprising a first biometric data representing the participant in the program database as database data and forming a secured registered account for the participant;
b. assigning at least one program to the participant with the secured registered account, wherein each assigned program is stored in the secured registered account of the program database for use by the participant;
c. verifying that the participant at a program access point matches the database data and the participant is eligible to access at least one assigned program, wherein the verifying of the participant's identity authentication and eligibility verification comprise the steps of:
i. obtaining a second individual information including a second biometric data of the participant at the program access point using a biometric device in communication with the program access point and the program database;
ii. transmitting in a first transmission the second individual information of the participant from the program access point to the program database for requesting an identity authentication of the participant and eligibility verification to access and use at least one assigned program;
iii. comparing the transmitted second individual information of the participant to the database data to verify that the transmitted second individual information of the participant is identical to the database data for the identity authentication of the participant; and
iv. transmitting in a second transmission from the program database to the program access point the eligibility verification or denial of the participant for accessing and using at least one assigned program, wherein eligibility verification of the participant to use at least one assigned program provides the participant with access to use at least one program assigned to the participant based on a determination that the second individual information of the participant is identical to the database data and the access by the participant to at least one assigned program is within an available scope of the assigned programs for the participant for verifying eligibility, thereby preventing fraud and enhancing security management and privacy protection; and d. updating the database data by transmitting in a third transmission from a program exit point to the program database that the participant has engaged the program exit point for updating the database data after use by the participant of at least one assigned program for exit verification and program completion.

27. The method of claim 26, further comprising assigning a contactless participant smart card to the participant with the secured registered account, wherein the contactless participant smart card comprises a data storage for storing smart card data, wherein the smart card data comprises a copy of the pre-registration individual information comprising the first biometric data, at least one program assigned to the participant, at least one risk factor assigned to the participant, and combinations thereof.

* * * * *